United States Patent Office 2,807,591
Patented Sept. 24, 1957

2,807,591

WATER-SOLUBLE GUMS OF IMPROVED WATER SOLUBILITY AND METHOD OF PRODUCING SAME

John E. Henry, Rivercrest, Va., assignor to Hercules Powder Company, Wilmington, Del., a corporation of Delaware No Drawing. Application November 20, 1953, Serial No. 393,507

4 Claims. (Cl. 252—363.5)

This invention relates to water-soluble gums of improved water solubility and to a treatment for water-soluble gums, having a tendency when mixed with water, to form agglomerates, to improve their solution rate in water.

Although water-soluble gums dissolve in water to form solutions having numerous commercial applications, inordinately long periods of time have often been required to form such solutions. This has been a handicap which has limited the utility of some gums in many applications where rapid and easy solution with a minimum amount of agitation is necessary.

The problem is not that the individual particles of the gum are difficult to dissolve, for in reality such individual particles hydrate, swell and disperse to form colloidal solutions relatively rapidly unless hindered by agglomeration. The difficulty lies in the fact that numerous individual particles tend to agglomerate when the material is mixed with water. Rapid hydration takes place over the surface of such agglomerated aggregates to form gel-coated lumps, and these are then extremely difficult to dissolve. This effect is aggravated by the fact that some gums have a tendency to float on the surface of the water allowing partially dissolved particles to agglomerate into large lumps or masses. This phenomenon is quite general and has been observed with various of the water-soluble gums in commercial use. Due to this tendency to form gelatinous lumps, it has been necessary to employ costly, powerful, high-speed mixing equipment capable of developing high shear in order to break up such lumps and facilitate rapid solution. Thus, the problem of increasing the rate and ease of solution of water-soluble gums is largely one of reducing the tendency to form large gel masses and of enhancing dispersion of the individual particles of gum through the water to allow rapid hydration and solution of the individual particles without resort to costly and powerful agitation equipment.

Therefore, the primary objects of the invention are to provide water-soluble gums of improved water solubility and to provide a treatment for water-soluble gums to improve their solution rate in water.

Other objects of the invention will appear hereinafter, the novel features and combinations being set forth in the appended claims.

According to this invention, improvement of the solution rate of water-soluble gums, having a normal tendency when mixed with water to form agglomerates, is provided by mixing water-soluble gum with a water-soluble additive mixture which is substantially unreactive in the dry state but reacts readily in water to evolve sufficient carbon dioxide to disperse the water-soluble gum in the water and substantially reduce the tendency for the water-soluble gum to form agglomerates and thereby obtain a rapid solution rate. There is thus provided a mixture comprising substantially dry water-soluble gum and substantially dry water-soluble additive mixture, said water-soluble additive mixture containing as essential ingredients a water-soluble carbonate and at least one member of the group consisting of water-soluble acid salts and crystalline acids.

A preferred embodiment of the invention is presented herein for the purpose of illustration wherein sodium carboxymethylcellulose has been chosen as the water-soluble gum but it will, of course, be understood that the invention applies to other water-soluble gums and that different additive mixtures may be employed to evolve the carbon dioxide required for dispersion.

The examples in the following table set forth the way in which the principle of the invention is practiced. It is to be understood, however, that the examples are purely illustrative and are not to be construed as a limitation on the invention. The table gives examples showing the effect of amount and type of additive mixture on the solution rate of a water-soluble gum which in accordance with the preferred embodiment of the invention is sodium carboxymethylcellulose designated simply as CMC in the table.

TABLE

| Ex. | CMC | Additive mixture, percent each component | | | | | Solution rate, min. |
|---|---|---|---|---|---|---|---|
| | | NaHCO$_3$ | Na$_2$CO$_3$ | NaHSO$_3$ | NaH$_2$PO$_4$ | Citric acid | |
| 1 | 100 | | | | | | 18.6 |
| 2 | 90 | 4.5 | | 5.5 | | | 16.6 |
| 3 | 90 | 6.0 | | | | | 11.4 |
| 4 | 90 | 5.5 | | | 4.0 | | 7.6 |
| 5 | 90 | | | 6.5 | 3.5 | 4.5 | 16.5 |
| 6 | 80 | 9 | | | 11 | | 6.0 |
| 7 | 80 | 12 | | | | 8 | 9.2 |
| 8 | 80 | 11 | | | | | 7.0 |
| 9 | 80 | | 13 | 7 | | 9 | 8.0 |
| 10 | 70 | 13 | | 17 | | | 3.5 |
| 11 | 70 | 18 | | | 12 | | 1 <0.5 |
| 12 | 70 | 16 | | | | 14 | 1 <0.5 |
| 13 | 70 | | 19 | 11 | | | 2 <0.5–4.0 |
| 14 | 60 | 18 | | 22 | | | 1 <0.5 |
| 15 | 60 | 23 | | | 17 | | 1 <0.5 |
| 16 | 60 | 22 | | | | 18 | 1 <0.5 |
| 17 | 60 | | 26 | 14 | | | 1 <0.5 |
| 18 | 50 | 22 | | 28 | | | 1 <0.5 |
| 19 | 50 | 29 | | | 21 | | 1 <0.5 |
| 20 | 50 | 27 | | | | 23 | 1 <0.5 |
| 21 | 50 | | 32 | 18 | | | 1 <0.5 |

[1] Could not be determined more accurately because the evolved CO$_2$ bubbles made the solution opaque for approximately 30 seconds. Upon subsidence of evolved CO$_2$ bubbles, the CMC was observed to be substantially completely dissolved.
[2] In some trials rapid and complete dispersion within 0.5 minute was attained, whereas in other trials one or two small agglomerates formed which required up to 4 minutes to dissolve.

With reference to the above table, the solution rates were determined by adding rapidly an amount of total sample given under each example equivalent to a 0.4% solution based on the weight of CMC into 300 milliliters of agitated 65° C. water and measuring the time required for complete solution. It will be noted that improved solution rate was obtained when using 10% or more of the additive mixture and that no additional advantage accrued in respect to dispersion by using more than 50%, although for certain uses it may be desirable to have more than 50% present. Accordingly, the amount of additive mixture constituting the upper limit of this invention is not critical and the invention is not to be construed as so limited. Still further, it will be noted that the additive mixture in accordance with this invention comprises a water-soluble carbonate which is alkaline in solution, including the bicarbonate which is weakly alkaline, in combination with water-soluble acid salt or crystalline acid, or mixtures thereof, for evolution of carbon dioxide.

The water-soluble carbonate component of the additive mixture can be any of the alkali metal carbonates or bicarbonates such as those of lithium, sodium, potassium, rubidium, caesium, and the like, ammonium carbonate or bicarbonate, and mixtures of any of these. Suitable water-soluble acid salts for admixture with the water-soluble carbonate component of the additive mixture are those in which only part of the available hydrogen of the acids from which the acid salts are derived has been replaced by a metal such as, by way of example, sodium bisulfite (NaHSO), sodium dihydrogen phosphate ($NaH_2PO_4$), sodium bisulfate ($NaHSO_4$), potassium acid phthalate ($KHC_8H_4O_4$), potassium acid tartrate ($KHC_4H_4O_6$), sodium acid thiosulfate ($NaHS_2O_3$), potassium dihydrogen citrate ($KH_2C_6H_5O_7$), and the like. Any water-soluble acid salt which upon mixture with a water-soluble carbonate will cause evolution of carbon dioxide when the mixture is brought into contact with water is suitable for the purposes of this invention. Suitable crystalline acids for admixture with the water-soluble carbonate component of the additive mixture are any of those which are solid at normal temperatures, and which when mixed with the carbonate component will cause evolution of carbon dioxide when the mixture is brought into contact with water such as, by way of example, adipic, arsenic, boric, chromic, citric, diethyl malonic, glutaric, maleic, lactic, malic, malonic, oxalic, periodic, pimelic, selenious, succinic, tartaric, tartronic, tetrolic acids and the like.

The most favorable ratio of water-soluble carbonate to water-soluble acid salt or crystalline acid in the additive mixture is that ratio which will evolve the maximum amount of carbon dioxide per unit weight of the additive mixture when the additive mixture is mixed with water, and it is obvious that this condition exists when the additive mixture contains stoichiometric or equivalent amounts of the water-soluble carbonate component and water-soluble acid salt or crystalline acid component. However, the invention is not limited to stoichiometric proportions of the carbonate and acidic components, for it is apparent that the water-soluble carbonate and water-soluble acid salt or crystalline acid when mixed in any proportions will evolve carbon dioxide when the additive mixture is mixed with water. Hence, any additive mixture containing water-soluble carbonate and water-soluble acid salt or crystalline acid in any proportion is within the scope of this invention.

The quantity of water-soluble additive mixture which is mixed with the water-soluble gum in accordance with this invention will vary somewhat depending upon the use for which the water-soluble gum containing the additive mixture is intended. In any case, however, a quantity of water-soluble additive mixture will be employed to evolve sufficient carbon dioxide to disperse the water-soluble gum in the water and substantially reduce the tendency for the water-soluble gum to form agglomerates. Normally, significant improvement in the solution rate of the water-soluble gum will require at least about 10% by weight of additive mixture based on the combined weight of water-soluble additive mixture and water-soluble gum.

To obtain optimum results the additives should be essentially dry and essentially in finely divided or powdered form, under which conditions simple mixing equipment is employed for mixing the additive mixture with the water-soluble gum. By finely divided or powdered form is meant that the components of the additive mixture should be sufficiently fine to pass through a 30-mesh sieve. For optimum results the components of the additive mixture should preferably be sufficiently fine to pass through a 100-mesh sieve. It is desirable to have both the water-soluble carbonate component and the water-soluble acid salt or crystalline acid component of the additive mixture of substantially uniform particle size in order to facilitate rapid and uniform evolution of carbon dioxide upon mixing with water. It has been found desirable to employ additive mixtures, the components of which have particle sizes at least as fine, and preferably finer, than the particles of the water-soluble gums with which the additive mixtures are incorporated.

The invention has been found to be generally applicable to the conventionally finely divided water-soluble gums which are soluble in both hot and cold water or soluble in cold and insoluble in hot water. Such gums include, by way of example, carboxyalkyl cellulose derivatives, such as carboxymethylcellulose, carboxyethyl cellulose, carboxypropyl cellulose, and the like; carboxyalkyl hydroxyalkyl cellulose derivatives, such as carboxymethyl hydroxyethyl cellulose, carboxyethyl hydroxyethyl cellulose, and the like; gum tragacanth, sodium alginate, psyllium seed, gum arabic, Irish moss, agar, algin, and the like; and methyl cellulose, ethyl cellulose, and the like.

By finely divided is meant that the particles of water-soluble gum are sufficiently fine to pass through a 30-mesh sieve. Particles substantially coarser than 30-mesh, although readily dispersed in water by the method of this invention, are generally of such size that the rate of solution of individual particles is relatively slow, even when they are efficiently distributed in the water. Solution rate of water-soluble gum in accordance with this invention improves with decreasing particle size when sufficient additive mixture is present to give the required dispersion, and very significant improvement in the solution rate is obtained, for example, with water-soluble gum having particles sufficiently fine to pass through 100-mesh.

The water-soluble gums in accordance with this invention should be essentially dry, as exemplified by commercially available products which contain small amounts of water, usually less than about 5% by weight, and are generally designated as being air-dry.

The term "water-soluble" as used herein means at least sufficient solubility in water so that all of the material employed as the additive mixture with the water-soluble gum is completely dissolved by the water used to dissolve the water-soluble gum.

The advantages of this invention are multifold in that water-soluble gums which tend to agglomerate can be dissolved with little or no agitation; solutions are produced much more rapidly than by other methods; the physical form of the water-soluble gum is of less importance relative to solubility; and the reaction or residual salt can be varied to give desired results for certain applications.

What I claim and desire to protect by Letters Patent is:

1. As a new composition, a mixture consisting essentially of substantially dry finely divided water-soluble sodium carboxymethylcellulose having a normal tendency when mixed with water to form agglomerates, and substantially dry finely divided water-soluble additive mixture which is substantially unreactive in the dry state but reacts readily in water to evolve carbon dioxide, said additive mixture containing as essential ingredients a water-soluble carbonate and at least one member of the group consisting of water-soluble acid salts and crystalline acids and being present in an amount of at least about 10% by weight based on the combined weight of additive mixture and sodium carboxymethylcellulose to evolve sufficient carbon dioxide to disperse the water-soluble sodium carboxymethylcellulose in water and substantially reduce the tendency of same to form agglomerates and thereby obtain a rapid solution rate.

2. A composition in accordance with claim 1 wherein the water-soluble additive mixture contains as essential ingredients sodium bicarbonate and sodium dihydrogen phosphate.

3. A composition in accordance with claim 1 wherein the water-soluble additive mixture contains as essential ingredients sodium bicarbonate and sodium hydrogen sulfite.

4. A composition in accordance with claim 1 wherein the water-soluble additive mixture contains as essential ingredients sodium bicarbonate and citric acid.

References Cited in the file of this patent

UNITED STATES PATENTS

| Number | Name | Date |
|---|---|---|
| 1,037,078 | Strickler | Aug. 27, 1912 |
| 2,399,085 | Winslow | Apr. 23, 1946 |
| 2,477,492 | Moose | July 26, 1949 |
| 2,579,381 | Funderburk | Dec. 18, 1951 |
| 2,637,536 | De Ment | May 5, 1953 |
| 2,725,301 | Mayer et al. | Nov. 29, 1955 |